(12) United States Patent
Kunapuli et al.

(10) Patent No.: US 11,796,508 B2
(45) Date of Patent: Oct. 24, 2023

(54) SURFACE ACOUSTIC WAVE SENSOR FOR REFRIGERANT LEAKAGE DETECTION

(71) Applicant: Parker-Hannifin Corporation, Cleveland, OH (US)

(72) Inventors: Raghuit Prasad Kunapuli, Chesterfield, MO (US); Praveen Thallapally, Richland, WA (US); Bernard P. McGrail, Pasco, WA (US); Deng Zhiqun, Richland, WA (US); Jian Liu, Richland, WA (US); Huidong Li, Richland, WA (US); Jun Lu, Richland, WA (US); Debasis Banerjee, Ellisville, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 17/635,118

(22) PCT Filed: Aug. 25, 2020

(86) PCT No.: PCT/US2020/047712
§ 371 (c)(1),
(2) Date: Feb. 14, 2022

(87) PCT Pub. No.: WO2021/041359
PCT Pub. Date: Mar. 4, 2021

(65) Prior Publication Data
US 2022/0326183 A1    Oct. 13, 2022

Related U.S. Application Data

(60) Provisional application No. 62/894,348, filed on Aug. 30, 2019.

(51) Int. Cl.
*G01N 29/02* (2006.01)

(52) U.S. Cl.
CPC ... *G01N 29/022* (2013.01); *G01N 2291/0256* (2013.01); *G01N 2291/0423* (2013.01)

(58) Field of Classification Search
CPC ......... G01N 29/022; G01N 2291/0256; G01N 2291/0423; G01N 2291/0255
See application file for complete search history.

(56) References Cited

U.S. PATENT DOCUMENTS

| | | | | |
|---|---|---|---|---|
| 5,817,922 A | * | 10/1998 | Rapp | G01N 29/2462 310/313 R |
| 9,329,154 B1 | * | 5/2016 | Allendorf | G01N 29/022 |

(Continued)

FOREIGN PATENT DOCUMENTS

| | | |
|---|---|---|
| EP | 3203221 A1 | 8/2017 |
| WO | 2010/078337 A1 | 7/2010 |
| WO | 2018/140696 A1 | 8/2018 |

OTHER PUBLICATIONS

International Search Report and Written Opinion of the International Searching Authority for corresponding International Patent Application No. PCT/US2020/047712, dated Nov. 10, 2020.

(Continued)

*Primary Examiner* — Francis C Gray
(74) *Attorney, Agent, or Firm* — Renner, Otto, Boisselle & Sklar, LLP

(57) ABSTRACT

A SAW sensor is optimized for detection of refrigerant leakage in a refrigerant system or other gases, vapors, explosives or chemicals of interest. The SAW sensor includes a piezoelectric substrate; an interdigitated transducer deposited on the piezoelectric substrate, the interdigitated transducer having an input portion that receives input surface acoustic waves and an output portion that emits output surface acoustic waves; and a refrigerant sensor film located between the input portion and the output portion of the interdigitated transducer, the refrigerant sensor film including a sorbent material that is selected for preferential adsorption of a target refrigerant over atmospheric gases. Adsorption of the target refrigerant by the sorbent material results in a frequency shift of a frequency of the output (Continued)

surface acoustic waves relative to a frequency of the input surface acoustic waves. The sorbent material may be a metal organic framework (MOF) material, a covalent organic framework (COF) material, a porous organic cage or organic macrocyles such as calix [n] arene and its related derivatives.

8 Claims, 7 Drawing Sheets

(56) References Cited

U.S. PATENT DOCUMENTS

| | | | |
|---|---|---|---|
| 2006/0005608 A1* | 1/2006 | Kitzhoffer | G01N 15/0893 |
| | | | 73/38 |
| 2007/0241637 A1 | 10/2007 | Kalantar-Zadeh | |
| 2008/0315718 A1 | 12/2008 | Edmonson et al. | |
| 2009/0056536 A1* | 3/2009 | Wright | A62B 18/088 |
| | | | 73/1.06 |
| 2009/0064693 A1 | 3/2009 | Matsiev et al. | |
| 2016/0131615 A1* | 5/2016 | Sun | G03F 7/0002 |
| | | | 264/293 |
| 2018/0136187 A1* | 5/2018 | Doutt | G01N 30/08 |
| 2018/0372662 A1* | 12/2018 | Boudaden | G01N 27/127 |

OTHER PUBLICATIONS

Written Opinion of the International Preliminary Examining Authority for corresponding International Patent Application No. PCT/US2020/047712, dated Sep. 3, 2021.

* cited by examiner

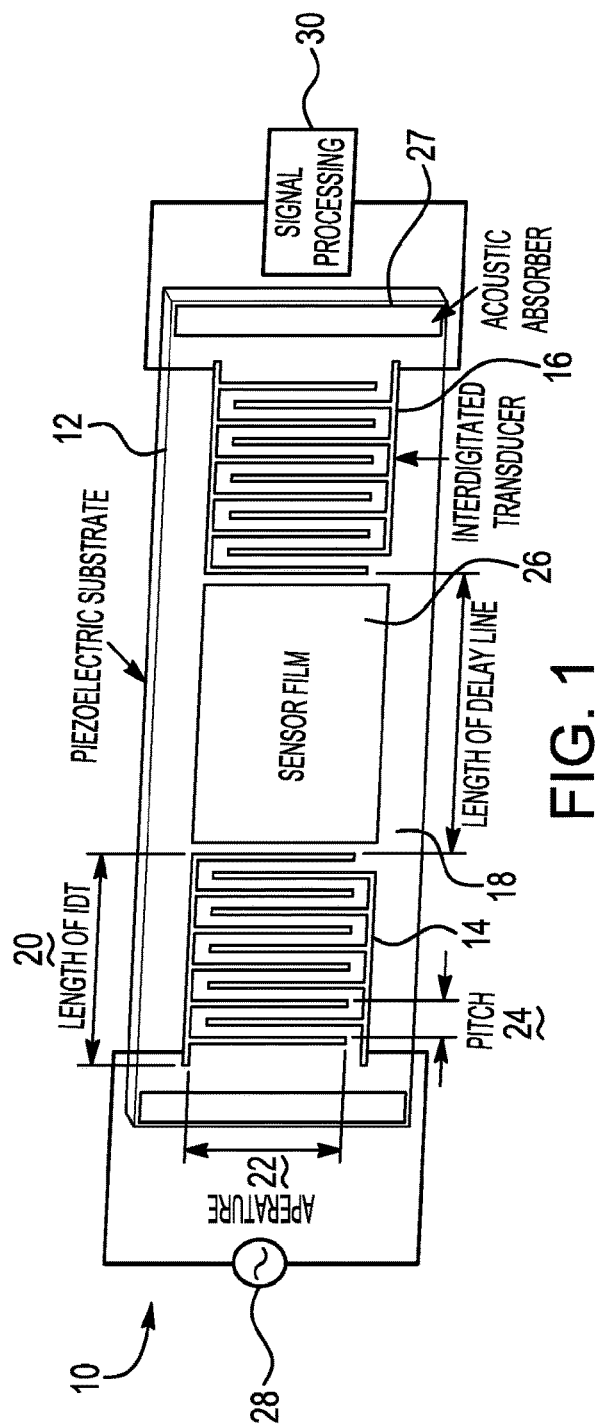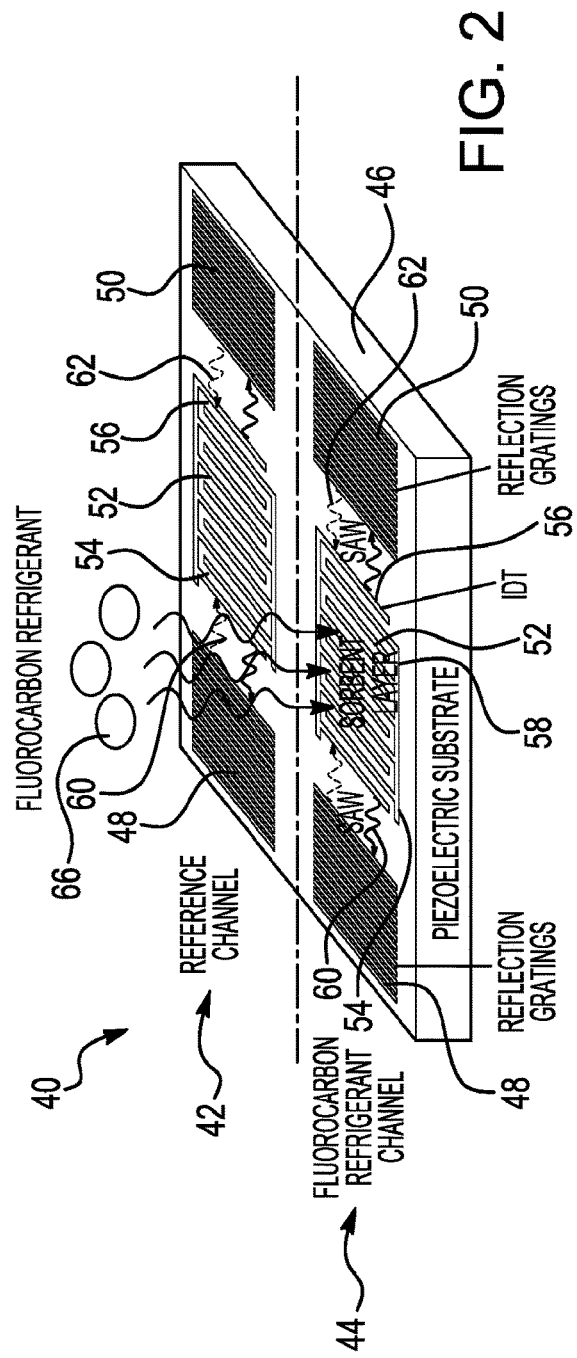

ADSORPTION OF R-134a IN MOF-74-M SERIES
(M = Mg, Ni, Co, Zn)

ADSORPTION OF REFRIGERANTS R-32 IN MIL-101(Cr)

CRYSTALLINE STRUCTURE OF MOF-74

CRYSTALLINE STRUCTURE OF MIL-101 (Cr)

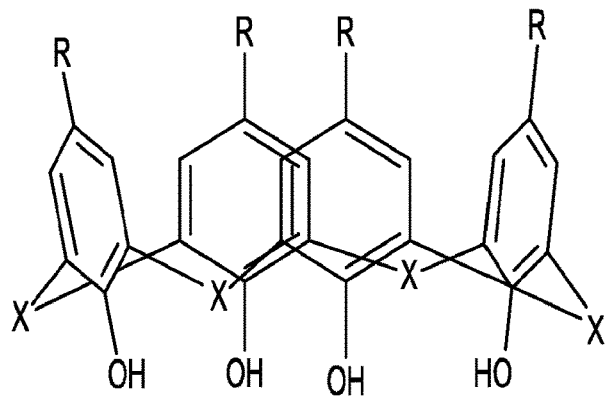
X = -CH$_2$ OF S
R - H, TERT-BUTYL, OR HEXYL OR OTHER ORGANIC GROUPS
CALIXARENE AND RELATED DERIVATIVES
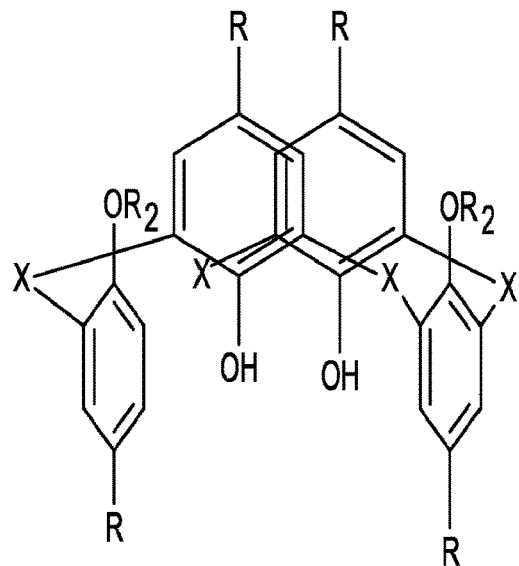
X = -CH$_2$ OF S
R - H, TERT-BUTYL, OR ADMANTYL, OR HEXYL OR OTHER ORGANIC GROUPS
R2 = MATHYL, -OR ETHYL OR -PROPYL OR COMBINATION
FIG. 10

SURFACE ACOUSTIC WAVE SENSOR FOR REFRIGERANT LEAKAGE DETECTION

RELATED APPLICATIONS

This application is a national phase of International Application No. PCT/US2020/047712 filed Aug. 25, 2020, which claims the benefit of U.S. Provisional Application No. 62/894,348 filed Aug. 30, 2019, the contents of which are incorporated herein by reference.

GOVERNMENT LICENSE RIGHTS

This invention was made with government support under Contract No. DE-AC05-76RL01830 awarded by the U.S. Department of Energy. The government has certain rights in the invention.

FIELD OF INVENTION

The present invention relates generally to refrigerant sensors for detecting refrigerant leakage in heating, ventilation, air conditioning, and refrigerant (HVAC&R) systems.

BACKGROUND

A refrigerant leak from an HVAC&R system constitutes a significant safety concern. Reliable detection of refrigerant leaks is a prerequisite for enabling more widespread use of class A2L and A3 refrigerants in HVAC&R systems. In conventional systems, infrared (IR) based sensors are currently used for refrigerant leakage detection, although there are several limitations of IR sensor technology. In particular, IR-based sensors are expensive to make, have limited lifecycle, and some IR-based sensors may need frequent calibration that adds to high cost for the leakage detection using a sensor package based on IR detection technology.

In other fields generally outside of refrigerant leakage detection in HVAC&R systems, surface acoustic wave (SAW) sensors are known. Surface acoustic waves (SAWs) are electro-mechanical waves that form on the surface of piezoelectric crystals. The nature of the SAW wave can be tweaked or altered by coating an appropriate sensor film material on the top of a piezoelectric substrate material. The effect of a change of mass loading from adsorption of targeted adsorbate by the sensor film is usually detected by a decrease in resonance frequency or phase shift in the surface acoustic waves as the waves propagate through the SAW sensor film. Detection of such shifts can then be related to adsorption of a target material by the sensor film. For example, for sensing a gas like carbon dioxide ($CO_2$), a material that can selectively adsorb $CO_2$ over other atmospheric gases will lead to change in the output function of the SAW device, which in turn can be used as an indirect sensing of $CO_2$ by the device. As another example, there are uses of SAW based detection technology for detecting trihalomethane in water. The material that is used for the sensor film is a carbon-based material that is specifically designed for trihalomethane adsorption for sensing.

The effectiveness of a SAW sensor, therefore, is contingent on identifying and utilizing the right material as the sensor film for a particular application, i.e., a sensor film material that is highly adsorbent for a target material to be sensed as compared to atmospheric gases, which has precluded the use of SAW sensors for refrigerant leakage detection. In other words, conventional adsorbent materials utilized in current SAW sensors have proven to be non-suitable in the field of refrigerant leakage detection in HVAC&R systems, as conventional sorbent materials do not effectively adsorb common target refrigerants. Existing SAW sensor literature references using zeolite or activated carbon type of adsorbents for sensing, which generally are not optimal for refrigerant leakage detection.

SUMMARY OF INVENTION

There is a need in the art, therefore, for an enhanced sensor for detecting refrigerant leakage in an HVAC&R system. Embodiments of the present application provide a cost-effective surface acoustic wave (SAW) sensor that can detect refrigerant leakage with high sensitivity and selectivity. For a refrigerant leakage detection application, the inventors have identified suitable sorbent materials that can selectively adsorb standard or common fluorocarbon-based refrigerants over other mainly atmospheric gases. Such sorbent materials have not been used in conventional SAW sensors that have been used in other fields. Examples of suitable sorbent materials as demonstrated by the inventors include metal organic framework (MOF) materials covalent organic frameworks (COF) materials, porous organic cages or frameworks and organic macrocycles such as calixarenes derivatives.

In exemplary embodiments, a selected sorbent material in a stand-alone or mixed form is grown as a refrigerant sensor film onto the delay lines of the SAW sensor piezoelectric substrate to sense refrigerant materials, which increases the accumulation and localizes the mass on the sensing area, to lead to a better signal-to-noise ratio. The sorbent layer on the SAW sensor results in selective detection of targeted refrigerant molecules by a variety of mechanisms such as size exclusion, surface adsorption, physical adsorption, and/or chemical adsorption processes. Different materials or combination of materials along with layer thickness can be optimized to achieve targeted properties that are optimized for detecting particular target refrigerants. The SAW sensor technology of the current application generally is applicable to selectively detect the multitude of refrigerants typically in use today for HVAC&R systems.

Advantages of embodiments of the current application include the use of stable sorbent materials, which are not used in prior SAW sensors, that can selectively adsorb A2L, A3 and other fluorocarbon-based refrigerants over other atmospheric gases, rendering such sorbent materials suitable for use in refrigerant leakage detection. Such stability enhances the useful lifecycle of the sensors. These sorbent materials deposited over a SAW piezoelectric substrate result in a better signal-to-noise ratio, once refrigerant is adsorbed by the sorbent material that has been deposited on the SAW substrate. The SAW sensors of the current application provide for a more effective and lower cost solution for detecting refrigerant materials as compared to conventional refrigerant detection devices.

An aspect of the invention, therefore, is a SAW sensor that is optimized for detection of refrigerant leakage in a refrigerant system. In exemplary embodiments, the SAW sensor includes a piezoelectric substrate; an interdigitated transducer deposited on the piezoelectric substrate, the interdigitated transducer having an input portion that receives input surface acoustic waves and an output portion that emits output surface acoustic waves; and a refrigerant sensor film or layer located between the input portion and the output portion of the interdigitated transducer, the refrigerant sensor film including a sorbent material that is selected for preferential adsorption of a target refrigerant over atmospheric gases. Adsorption of the target refrigerant by the sorbent material results in a frequency shift of a frequency of the output surface acoustic waves relative to a frequency of the input surface acoustic waves. The sorbent material may be a metal organic framework (MOF) material, such a MOF-74-M (M=Mg, Co, Ni, Cu, Zn), MIL-101-M (Cr, Al, Fe), MSDB (M=Ca, Li, Cd, Zr, etc.), series material, a covalent organic framework (COF) material such as PAF-32, a porous organic cage material such as CC3 or a porous organic macrocycle material such as calix [4] arene and related derivatives.

In exemplary embodiments of the SAW sensor, the piezoelectric substrate is delineated into a reference channel and a refrigerant channel. The reference channel includes a first interdigitated transducer deposited on the piezoelectric substrate, the first interdigitated transducer having an input portion that receives input surface acoustic waves and an output portion that emits output surface acoustic waves. The refrigerant channel includes a second interdigitated transducer deposited on the piezoelectric substrate, the second interdigitated transducer having an input portion that receives the input surface acoustic waves and an output portion that emits output surface acoustic waves; and a refrigerant sensor film or layer located between the input portion and the output portion of the second interdigitated transducer, the refrigerant sensor film including a sorbent material that is selected for preferential adsorption of a target refrigerant over atmospheric gases. In the refrigerant channel adsorption of the target refrigerant by the sorbent material results in a frequency shift of a frequency of the output surface acoustic waves relative to a frequency of the input surface acoustic waves, and in the reference channel there is no frequency shift of a frequency of the output surface acoustic waves relative to a frequency of the input surface acoustic waves.

Another aspect of the invention is method of detecting a target refrigerant that includes the steps of: inputting an input signal to a surface acoustic wave (SAW) sensor to generate input surface acoustic waves; propagating the input surface acoustic waves through a refrigerant sensor film of the SAW sensor to generate output surface acoustic waves, wherein the refrigerant sensor film includes a sorbent material that is selected for preferential adsorption of the target refrigerant over atmospheric gases; measuring the output surface acoustic waves and a calculating a frequency shift of a frequency of the output surface acoustic waves relative to a frequency of the input surface acoustic waves; and determining a concentration of the target refrigerant based on the frequency shift. In exemplary embodiments, the SAW sensor has a refrigerant channel that includes the refrigerant sensor film and a reference channel that does not include a refrigerant sensor film, and the method further includes: propagating the input surface acoustic waves through the reference channel to generate output surface acoustic waves from the reference channel; measuring the output surface acoustic waves from the reference channel; and determining the concentration of the target refrigerant based on a comparison of the frequency shift of the output surface acoustic waves relative to the input surface acoustic waves in the refrigerant channel and a frequency of the output surface acoustic waves from the reference channel.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 1 is a drawing depicting a base structure of an exemplary SAW sensor.

FIG. 2 is a drawing depicting an exemplary SAW sensor in accordance with embodiments of the present application.

FIG. 10 is a drawing depicting Calixarene and related derivative materials that may be used as the sorbent material in accordance with embodiments of the present application.

DETAILED DESCRIPTION

Figure 3:
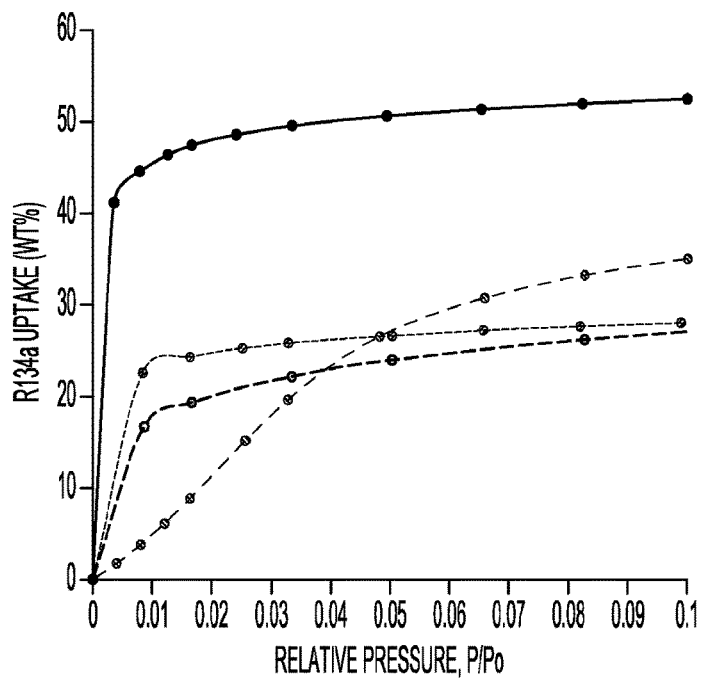
FIG. 3 is a drawing depicting a graph of R134a refrigerant uptake versus relative pressure for different sorbent materials.

Embodiments of the present invention will now be described with reference to the drawings, wherein like reference numerals are used to refer to like elements throughout. It will be understood that the figures are not necessarily to scale.

The present disclosure pertains to an enhanced sensor for detecting refrigerant leakage in an HVAC&R system. Embodiments of the present application provide a cost-effective surface acoustic wave (SAW) sensor that can detect refrigerant leakage with high sensitivity and selectivity. For a refrigerant leakage detection application, the inventors have identified suitable sorbent materials that can selectively adsorb standard or common fluorocarbon-based refrigerants over other mainly atmospheric gases. Further by changing the selective adsorbent thin film or layer the SAW sensor can be designed to detect VOCs of interest (formaldehyde or benzene etc.) or explosive detection (TNT or TNB etc.). Such sorbent materials have not been used in conventional SAW sensors that have been used in other fields. Examples of suitable sorbent materials as demonstrated by the inventors include Metal Organic Framework materials such a MOF-74-M (M=Mg, Co, Ni, Cu, Zn), MIL-101-M (Cr, Al, Fe), MSDB (M=Alkali and alkaline metals, M2+ and 3+ transition metals and 3+ and 4+ lanthanides and actinides) series material, a covalent organic framework (COF) material such as PAF-32, a porous organic cage material such as CC3 or a porous organic macrocycle material such as calix [4] arene and related derivatives. Examples of these substances are illustrated in FIGS. 7-11.

FIG. 1 is a drawing depicting a base structure of an exemplary SAW sensor 10. The SAW sensor 10 includes a piezoelectric substrate 12 on which there is disposed a first or input interdigitated transducer 14 and a second or output interdigitated transducer 16. The space separating the input and output interdigitated transducers is referred to as a delay line 18 having a length as indicated in FIG. 1. Each of the interdigitated transducers 14 and 16 may be characterized by a length 20 along a longitudinal direction of the piezoelectric substrate 12, and an aperture 22 corresponding to a width along the transverse direction of the piezoelectric substrate 12. Each of the interdigitated transducers 14 and 16 further may be characterized by a pitch 24 constituting a width of the interdigitations. In adsorption SAW sensors, a sensor film 26 is deposited on the delay line 18, and the sensor film is selected for high adsorption of a target substance. Acoustic absorbers 27 may be incorporated to provide acoustic insulation relative to undesirable environment acoustic sources.

In operation, a signal generator 28 applies an input signal to the input interdigitated transducer 14. Surface acoustic waves are generated that propagate across the delay line 18 to the output interdigitated transducer 16, and an output signal is measured off the output interdigitated transducer 16 using a signal processing unit 30. As referenced above, the effect of a change of mass loading from adsorption by the sensor film is usually detected by a decrease in resonance frequency or phase shift in the surface acoustic waves as the waves are propagated through the SAW sensor film. Detection of such shifts can then be related by the signal processing unit to adsorption of a target material by the sensor film.

Embodiments of the present application operate on comparable principles as the base structure depicted in FIG. 1, but optimized for the detection of refrigerant leakage. In exemplary embodiments, a selected sorbent material in a stand-alone or a mixed phase as in two materials are mixed with each other, where their complimentary properties can help to achieve complimentary properties (e.g., mixed metal based MOFs and/or mixed phase MOFs), is grown as a refrigerant sensor film onto the delay lines of the SAW sensor piezoelectric substrate to sense refrigerant materials, which increases the accumulation and localizes the mass on the sensing area, to lead to a better signal-to-noise ratio. The sorbent layer on the SAW sensor results in selective detection of targeted refrigerant molecules by a variety of mechanisms such as size exclusion, surface adsorption, physical adsorption, and/or chemical adsorption processes. Different materials or combination of materials, along with layer thickness, can be optimized to achieve targeted properties that are optimized for detecting particular target refrigerants. The SAW sensor technology of the current application generally is applicable to selectively detect the multitude of refrigerants for HVAC&R systems.

An aspect of the invention, therefore, is a SAW sensor that is optimized for detection of refrigerant leakage in a refrigerant system. In exemplary embodiments, the SAW sensor includes a piezoelectric substrate; an interdigitated transducer deposited on the piezoelectric substrate, the interdigitated transducer having an input portion that receives input surface acoustic waves and an output portion that emits output surface acoustic waves; and a refrigerant sensor film located between the input portion and the output portion of the interdigitated transducer, the refrigerant sensor film including a sorbent material that is selected for preferential adsorption of a target refrigerant over atmospheric gases. Adsorption of the target refrigerant by the sorbent material results in a frequency shift of a frequency of the output surface acoustic waves relative to a frequency of the input surface acoustic waves. The sorbent material may be a. metal organic framework (MOF) materials such a MOF-74-M (M=Mg, Co, Ni, Cu, Zn), MIL-101-M (Cr, Al, Fe), series material, HKUST-1; a covalent organic framework (COF) material such as PAF-32, a porous organic cage material such as CC3; or a porous organic macrocycle material such as calix [4] arene and related derivatives. These materials have exhibited to show significant refrigerant adsorption properties.

FIG. 2 is a drawing depicting a SAW sensor 40 in accordance with embodiments of the present application. The SAW sensor 40 includes a reference channel 42 that provides a reference measurement, and a refrigerant channel 44 that is used to adsorb refrigerant leakage, as described in further detail below. The SAW sensor 40 includes a piezoelectric substrate 46 that is delineated into the reference channel 42 and the refrigerant channel 44. For each of the reference channel 42 and refrigerant channel 44, there is disposed on the piezoelectric substrate 46 a first or input reflection grating 48 and a second or output reflection grating 50. An interdigitated transducer 52 includes an input portion 54 and an output portion 56. Similarly, as described with respect to FIG. 1, the interdigitated transducer 52 may be characterized by a length along a longitudinal direction of the piezoelectric substrate 46, an aperture corresponding to a width along the transverse direction of the piezoelectric substrate 46, and a pitch constituting a width of the interdigitations.

For use as an adsorption SAW sensor for detecting refrigerant leakage, a refrigerant sensor film 58 is deposited on the interdigitated transducer 52 within the refrigerant channel 44 between the input portion 54 and the output portion 56. This in essence creates a delay line in the refrigerant channel 42 comparably as described above with respect to FIG. 1. The refrigerant sensor film 58 is selected to include a sorbent material that has high adsorption propensity for a target refrigerant as compared to other atmospheric components. As referenced above, examples of suitable sorbent materials as demonstrated by the inventors include metal organic framework (MOF) materials such a MOF-74-M (M=Mg, Co, Ni, Cu, Zn), MIL-101-M (Cr, Al, Fe), series material; a covalent organic framework (COF) material such as PAF-32, a porous organic cage material such as CC3; or a porous organic macrocycle material such as calix [4] arene and related derivatives. These materials have exhibited to show significant refrigerant adsorption properties.

Parameters of the refrigerant sensor film 58, including pore size, pore volume of the adsorbent material and film thickness, and grain/particle size may be optimized for detection of a given refrigerant over accompanying atmospheric gas components. In particular, the tunable pore size and chemical functionality features of these sorbent materials is used to sieve accompanying atmospheric gases, such as $CO_2$, and adsorb refrigerant gas molecules instead. This selective adsorption overcomes the non-selectivity aspect of current SAW sensors that do not selectively adsorb typical refrigerant substances and thus are not suitable for refrigerant leakage detection. One specific example of a suitable sorbent material is MIL-101-Cr, a chromium-based MOF material that exhibits significant refrigerant (e.g., R-32) adsorption capability over other gases. Another suitable example film material is calix [4] arene and related derivatives. These molecules have shown significant R32 uptake or adsorption at or near room temperature. Along with MOFs, other porous, organic porous molecules, such as for example covalent organic framework (COF) materials may be used.

Methods such as dip-coating, spin coating, or traditional vapor deposition may be used to coat the refrigerant sensor film 58 onto the SAW piezoelectric substrate 42. Using SAW sensor embodiments of the current application, one can continuously monitor the concentration of a specific refrigerant and quickly respond to potential leakage in a matter of seconds. In addition, the low cost and robustness of the described SAW sensors enables deployment in a wide range of applications. The solution processable nature of these refrigerant sensor film molecules results in a comparatively easier fabrication path using standard coating technology including chemical vapor deposition. These coating technologies can also be used to control layer thickness of the refrigerant sensor film, which may be optimized for any particular application including any particular refrigerant. Furthermore, advanced material growth techniques may be implemented to improve the signal-to-noise ratio of the SAW sensor. The porous, interconnected nature of the pore structure of the refrigerant sensor film allows gas molecules to transport quickly and leads to a fast response. The inventors have found that by tuning the coating thickness, pore size, and sorbent material concentration in the refrigerant sensor film, an optimal response time can be achieved with a desired frequency shift for any given refrigerant. The sorbent materials used in the refrigerant sensor films for these SAW sensors are robust in nature and have the desired long-term stability for typical applications.

For example, CaSDB, SDB=4,4'-sulfonyldibenzoate may be used in which octahedrally coordinated calcium chains are connected by organic linkers to form a one-dimensional hydrophobic channel with pore diameter of 4.1 Å (ideal for R32 and R1234yf refrigerants). Another method of tuning the film is by down selecting MOFs or calixarene molecules with 7-electron rich surfaces that are attractive to fluorocarbons and with pore size approximately the size of the fluorocarbon refrigerant (3.5-4.5 Å) that may further enhance affinity and selectivity for fluorocarbon refrigerants. A majority of the V-shaped organic linkers will tend to have a pore size <0.5 nm depending on the linker.

In operation, a signal generator as referenced above applies an input signal to the input reflection gratings 48 for each of the reference channel 42 and the refrigerant channel 44. The signal generator may be any suitable electrical signal generator that generates a current waveform to be applied to the SAW sensor. The input reflection gratings 48 operate to generate resonance in connection with the input signal. Input surface acoustic waves 60 propagate from the input reflection gratings 48 to the input portions 54 of the interdigitated transducers 52. The interdigitated transducers 52 then generate output surface acoustic waves 62 that propagate from the output portions 56 of the interdigitated transducers 52 to the output reflection gratings 50. The output reflection gratings 50 operate to generate resonance of the output surface acoustic waves 62, which then may be detected and analyzed by any suitable signal processing unit similarly as referenced above with respect to FIG. 1. The signal processing unit may include suitable circuitry and/or processing devices such as a CPU, microcontroller or microprocessor. The signal processing unit may execute program code stored on a non-transitory computer readable medium, configured as any suitable electronic memory device, to perform the requisite calculations and determinations.

In the reference channel 42, the signal propagates from the input portion 54 of the interdigitated transducer 52 to the output portion 56 essentially without alteration. In contrast, in the refrigerant channel 44 the propagation of the signal through the interdigitated transducer 52 is altered by the presence of refrigerant sensor film 58. The sorbent material in the refrigerant sensor film 58 operates to adsorb fluorocarbon refrigerant molecules 66. The effect of a change of mass loading from adsorption of the refrigerant molecules 66 by the sorbent material of the refrigerant sensor film 58 generally results in a decrease in resonance frequency in the surface acoustic waves as the waves propagate through the refrigerant sensor film 58. Ultimately, such frequency shift is detected at the signal processing unit that receives the output of the Saw sensor. By using the output of the reference channel as a comparative result, detection of frequency shift in the output from the refrigerant channel relative to the output of the reference channel can then be related by the signal processing unit to adsorption of the target refrigerant by the refrigerant sensor film. In this manner, refrigerant leakage may be detected and quantified.

Another aspect of the invention, therefore, is method of detecting a target refrigerant that includes the steps of: inputting an input signal to a surface acoustic wave (SAW) sensor to generate input surface acoustic waves; propagating the input surface acoustic waves through a refrigerant sensor film of the SAW sensor to generate output surface acoustic waves, wherein the refrigerant sensor film includes a sorbent material that is selected for preferential adsorption of the target refrigerant over atmospheric gases; measuring the output surface acoustic waves and a calculating a frequency shift of a frequency of the output surface acoustic waves relative to a frequency of the input surface acoustic waves; and determining a concentration of the target refrigerant based on the frequency shift. In exemplary embodiments, the SAW sensor has a refrigerant channel that includes the refrigerant sensor film and a reference channel that does not include a refrigerant sensor film, and the method further includes: propagating the input surface acoustic waves through the reference channel to generate output surface acoustic waves from the reference channel; measuring the output surface acoustic waves from the reference channel; and determining the concentration of the target refrigerant based on a comparison of the frequency shift of the output surface acoustic waves relative to the input surface acoustic waves in the refrigerant channel and a frequency of the output surface acoustic waves from the reference channel.

Figure 5:
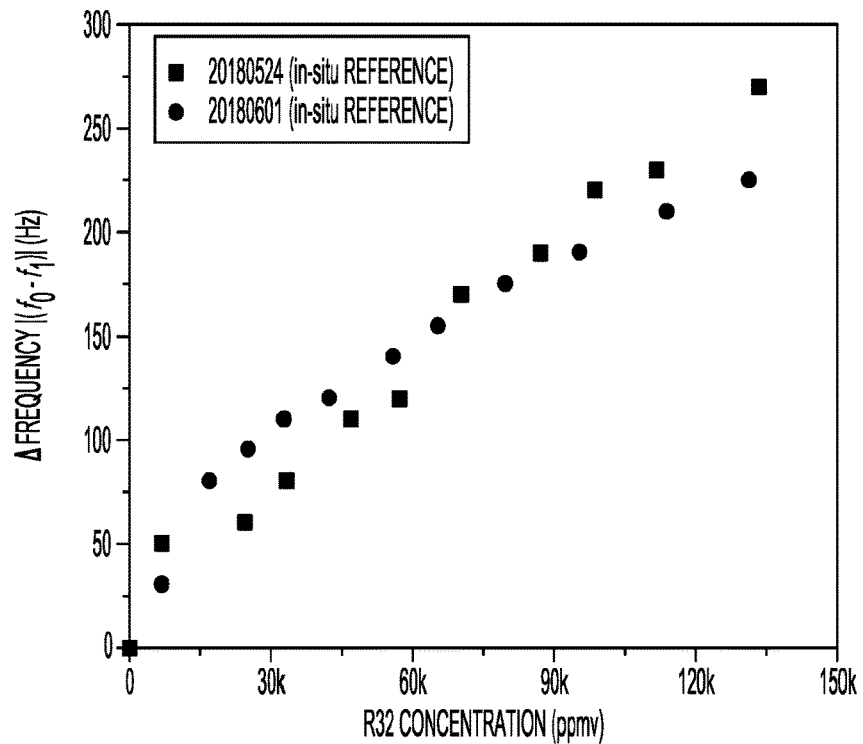
FIG. 5 is a drawing depicting a graph of output frequency shift versus R32 refrigerant concentration for an exemplary sorbent material used in accordance with embodiments of the present application.
Figure 6:
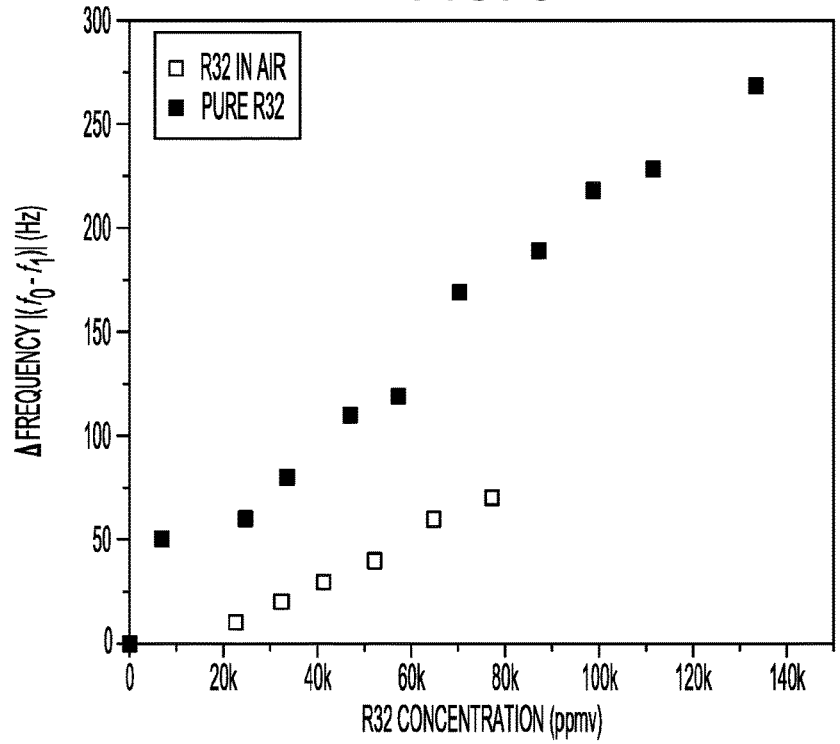
FIG. 6 is a drawing depicting a variation on the graph of FIG. 5, comparing frequency shift with pure R32 refrigerant as compared with R32 refrigerant in air.
Figure 7:
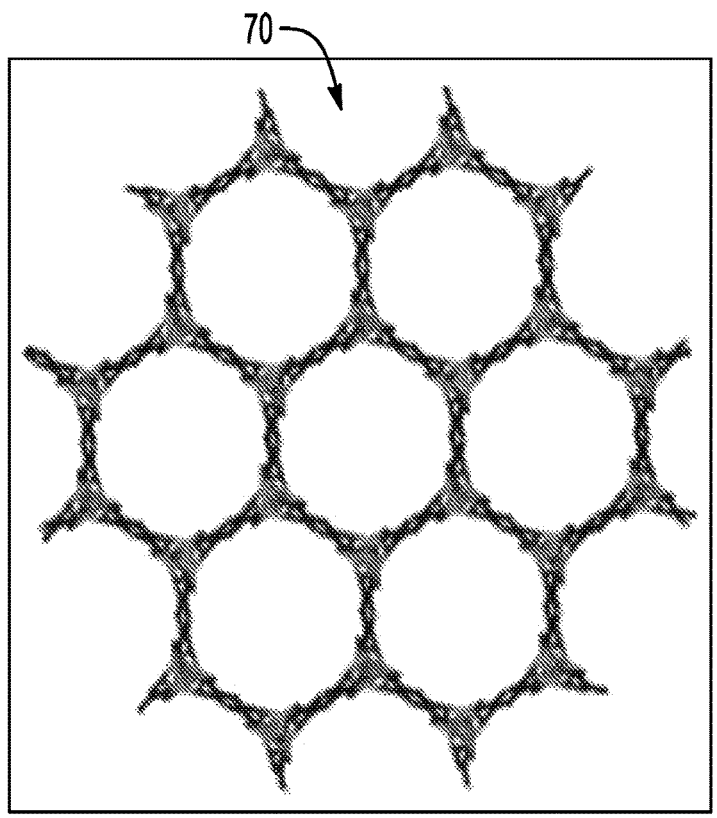
FIG. 7 is a drawing depicting a crystalline structure of an exemplary MOF-74-M series material that may be used as the sorbent material in accordance with embodiments of the present application.

In this regard, FIGS. 3-6 illustrate bases for use of embodiments of the current application for refrigerant leakage detection. In particular, FIG. 3 is a drawing depicting a graph of refrigerant uptake versus relative pressure for different sorbent refrigerant sensor materials. In this example, adsorption is illustrated for R-134a refrigerant when using MOF-74 series sorbent materials in the refrigerant sensor film. A crystalline structure of an exemplary MOF-74 material 70 is illustrated in FIG. 7. The four curves from top to bottom in FIG. 3 respectively correspond to M=Mg, Ni, Co, and Zn. As seen in FIG. 3, these curves demonstrate substantial uptake or adsorption of the R-134a refrigerant when using MOF-74 series materials as the sorbent material in the refrigerant sensor film.

Figure 4:
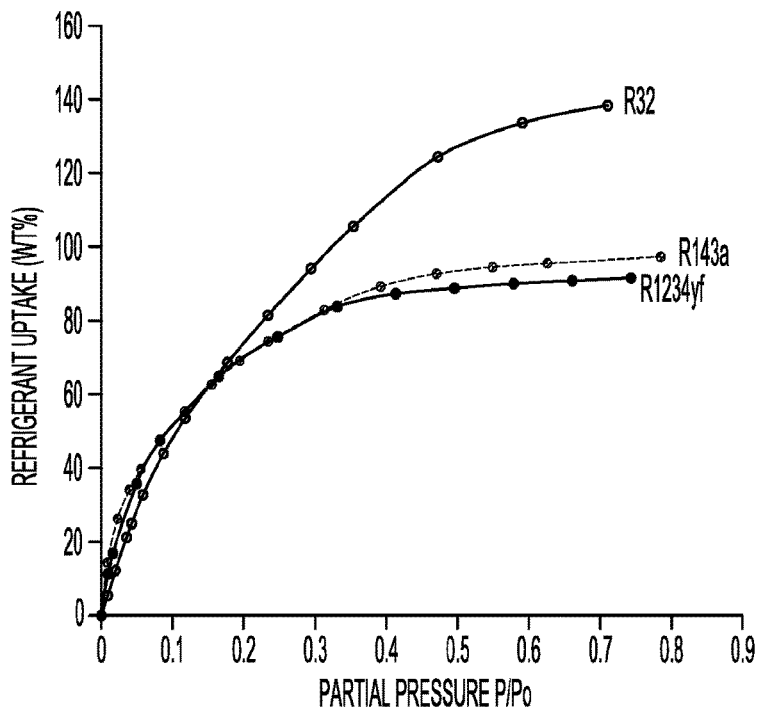
FIG. 4 is a drawing depicting a graph of refrigerant uptake versus partial pressure for an MIL-101-Cr sorbent material used in accordance with embodiments of the present application, for different refrigerants.
Figure 8:
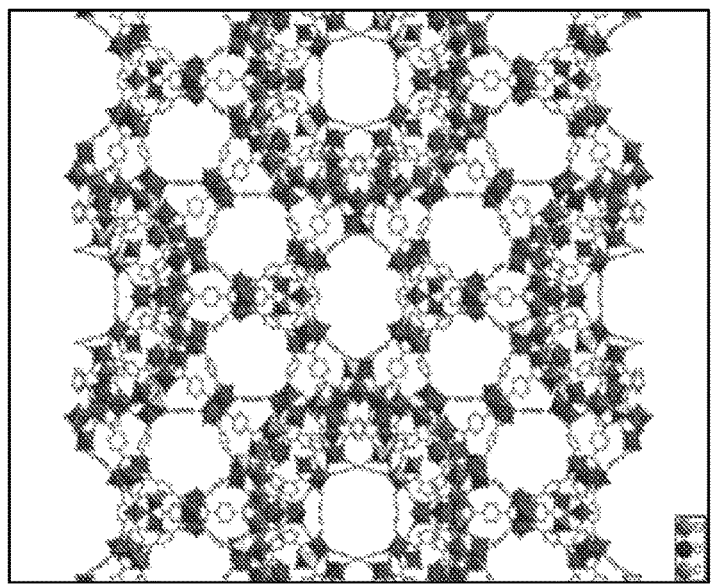
FIG. 8 is a drawing depicting a crystalline structure of an MIL-101-CR material that may be used as the sorbent material in accordance with embodiments of the present application.
Figure 9:
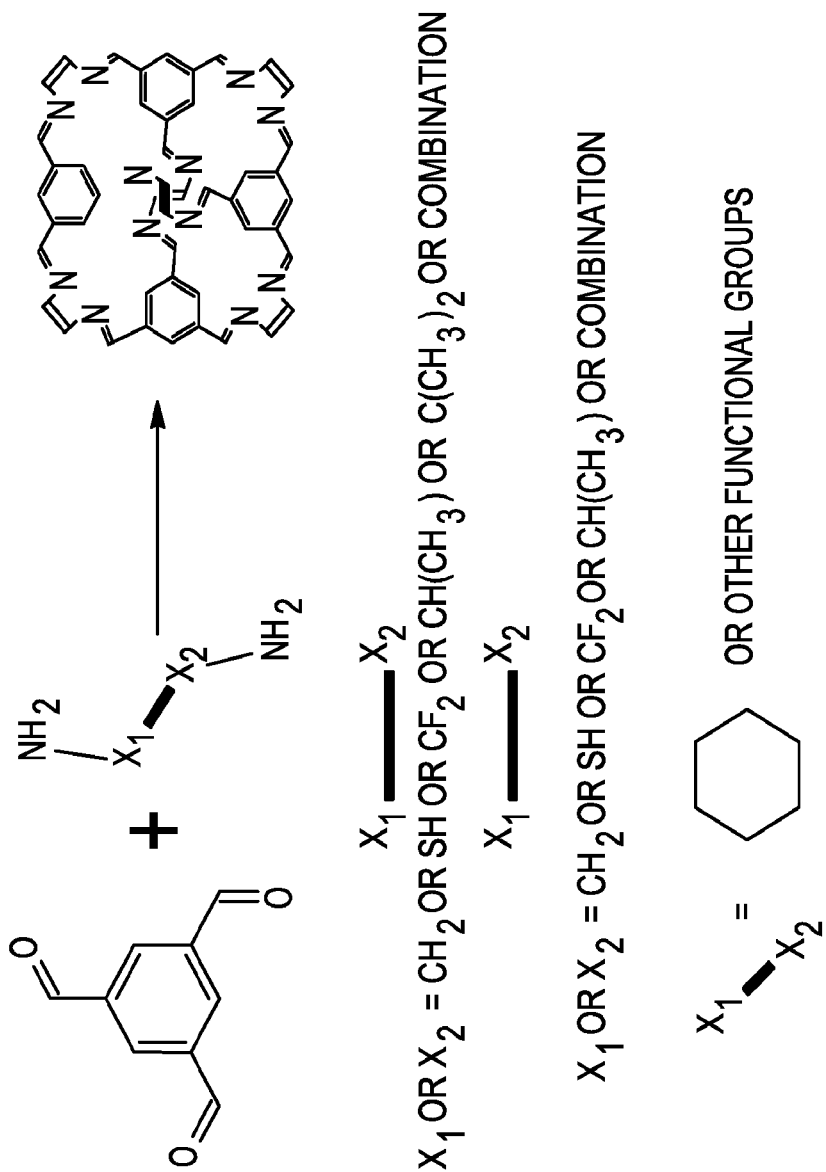
FIG. 9 is a drawing depicting porous organic cage materials that may be used as the sorbent material in accordance with embodiments of the present application.
Figure 11:
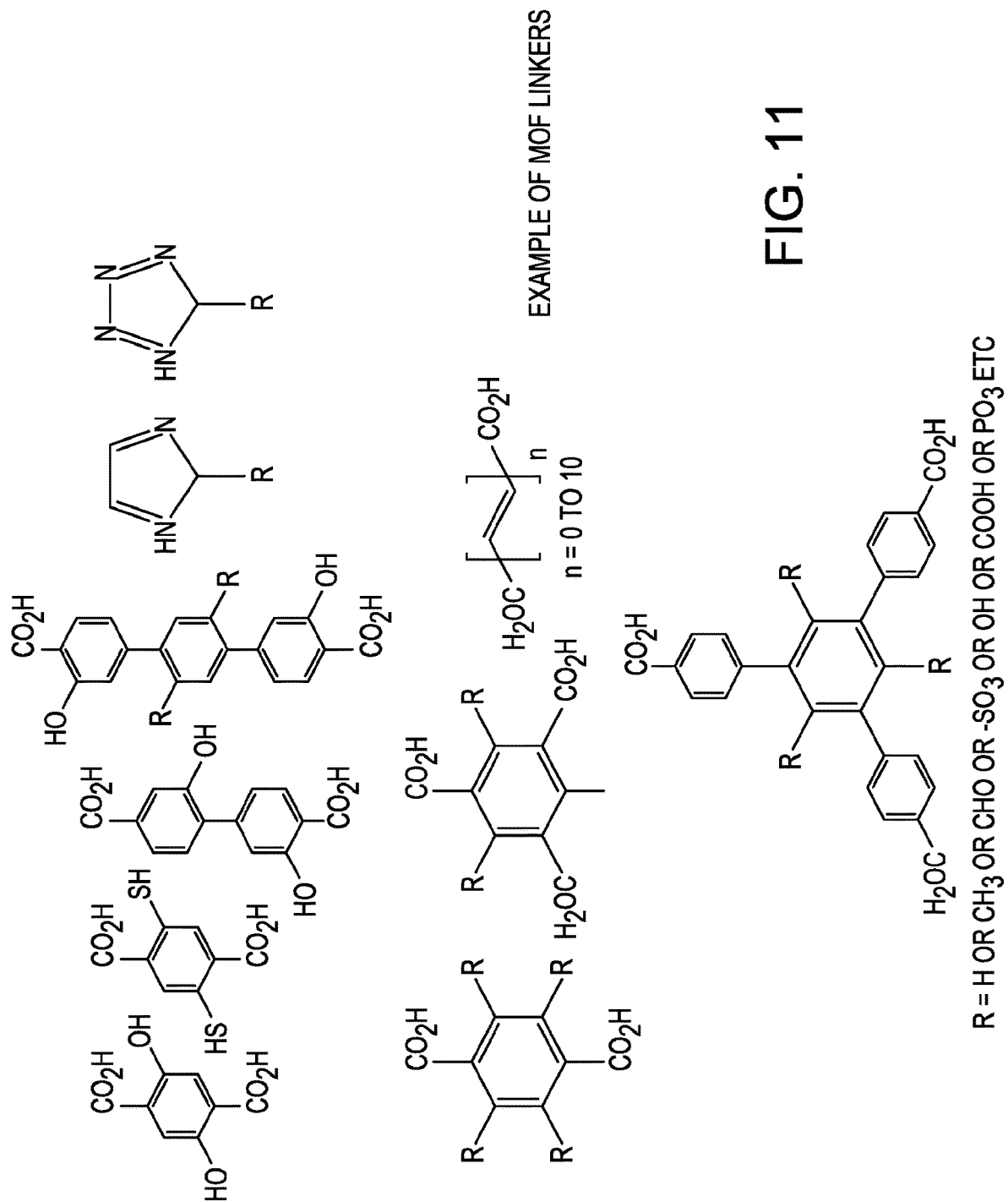
FIG. 11 is a drawing depicting MOF linker materials that may be used in accordance with embodiments of the present application.

FIG. 4 is a drawing depicting a graph of refrigerant uptake versus partial pressure for a MOF sorbent material for different refrigerants. In this example, the sorbent material specifically is a MIL-101-CR sorbent material, and refrigerant uptake is illustrated as to R32, R143a, and R1234yf refrigerants. A crystalline structure of an exemplary MIL-Cr-101 material 80 is illustrated in FIG. 8. As seen in FIG. 4, these curves demonstrate substantial update or adsorption of the various refrigerants when using MIL-101 material as the sorbent material in the refrigerant sensor film.

FIG. 5 is a drawing depicting a graph of output frequency shift versus R32 refrigerant concentration for an exemplary sorbent material used in accordance with embodiments of the present application. FIG. 6 is a drawing depicting a variation on the graph of FIG. 5, comparing output frequency shift with pure R32 refrigerant as compared with R32 refrigerant in air. In these examples, MIL-101 also is used as the sorbent material in the refrigerant sensor film. FIG. 5 illustrates two separate experimental runs showing the relationship between the concentration of a pure R32 sample and the output frequency shift that is measured from a SAW sensor configured comparably as described with respect to FIG. 2. FIG. 5 illustrates that there is essentially a linear relationship of frequency shift with refrigerant concentration, which illustrates how the principles of the present application may be used to detect refrigerant leakage.

In the variation of FIG. 6, one of the FIG. 5 plots is depicted in combination with a plot of frequency shift versus R32 refrigerant concentration, with the sample being R32 refrigerant in air. The example of FIG. 6 represents more real-world conditions, as leakage refrigerant would typically be contained in air. FIG. 6 illustrates that under the more real-world condition of R32 refrigerant in air, there again is essentially a linear relationship of frequency shift with refrigerant concentration, which further illustrates how the principles of the present application may be used to detect refrigerant leakage Advantages of embodiments of the current application include the use of stable sorbent materials for the refrigerant sensor film, which are not used in prior SAW sensors in other fields, whereby the stable sorbent materials of the current application can selectively adsorb R32, A2L, A3 and other fluorocarbon-based refrigerants over other gases. Such stability enhances the useful lifecycle of the sensors. These sorbent materials deposited over the SAW sensor substrate results in a better signal-to-noise ratio, once refrigerant is adsorbed by the sorbent material in the refrigerant sensor film that has been deposited on the SAW sensor piezoelectric substrate. The SAW sensors of the current application thus provide for a more effective and lower cost solution for detecting refrigerant leakage as compared to conventional refrigerant detection devices.

MOF based SAW sensors configured in accordance with embodiments of the present application may have additional applications in addition to detection of refrigerant leakage. For example, MOF based SAW sensors configured in accordance with embodiments of the present application may be employed for monitoring in-door air quality, such as for example by detecting contaminants such as volatile organic compounds, radon, and $CO_2$. Other potential applications of MOF based SAW sensors configured in accordance with embodiments of the present application may include noble gas sensing as may be employed in the nuclear industry, and explosives detection for security purposes.

Additional potential methods and uses of SAW sensors in accordance with embodiments of the present application may include the following:

A method of detecting a target gas like $CO_2$, $O_2$ and $N_2$, wherein the target gases are $CO_2$, $O_2$ and $N_2$ by changing the selective adsorbent layer or film on the SAW sensor.

A method of detecting a target gas like Noble gases (Xe, Rn, Ar, Kr, He), wherein the target gases are Xe, Rn, Ar, Kr, He by changing the selective adsorbent layer or film on the SAW sensor. For example, MOF generated from 4,4'-sulfonyldibenzoate and Metal clusters include, Calcium, Zirconium are ideal thin films or layers on SAW sensor for selective detection of Rn and/or Xe over other gases present in air.

A method of detecting a target gas like Noble gases (Xe, Rn, Ar, Kr, He, wherein the target gases are Xe, Rn, Ar, Kr, He by changing the selective adsorbent layer or film on the SAW sensor. For example, macrocycles generated from calix[n]arene or porous organic cage derived from the condensation 1,3,5-triformaldehyde and 1,2-diaminecyclohexane in various rations may be used as a selective organic layer for selective noble gas sensing over other gases present in air.

A method of detecting a target gas like volatile organic compounds including but not limited to formaldehyde, benzene, toluene (for indoor air quality), wherein the target volatile organic compounds by changing the selective adsorbent layer or film on the SAW sensor. For example, functionalized MOF generated from one of the organic linker described above and macrocycles generated from functionalized calix[n]arene, porous organic cages derived from the condensation 1,3,5-triformaldehyde and 1,2-diaminecyclohexane in various ratios may be used as a selective organic layer for selective VOC detection.

A method of detecting a target gas like explosive sensing including but not limited to 1,3-5-trinitrobenzene, 1,3,5-trinitrotoluene, RDX etc of any of claims 13-17, wherein the target analyte is 1,3-5-trinitrobenzene or 1,3,5-trinitrotoluene or RDX by changing the selective adsorbent layer or film on the SAW devise. For example, functionalized MOF generated from one of the organic linker described above and macrocycles generated from functionalized calix[n]arene, porous organic cages derived from the condensation 1,3,5-triformaldehyde and 1,2-diaminecyclohexane in various ratios may be used as a selective organic layer for selective explosive detection A method of detecting target chemicals like chemical warfare agent detection including but not limited to sarin, soman, cyclosarin, tabun, respiratory agents, antimuscarinic agents, or opioid agents, wherein the target analyte is either sarin or soman or cyclosarin or tabun or respiratory agents or antimuscarinic agents or opioid agents by changing the selective adsorbent layer or film on the SAW devise. For example, functionalized MOF generated from one of the organic linker described above and macrocycles generated from functionalized calix[n]arene, covalent organic frameworks or porous organic cages derived from the condensation 1,3,5-triformaldehyde and 1,2-diaminecyclohexane in various ratios may be used as a selective organic layer for selective detection of chemical warfare agents.

An aspect of the invention, therefore, is a SAW sensor that is optimized for detection of refrigerant leakage in a refrigerant system. In exemplary embodiments, the SAW sensor includes a piezoelectric substrate; an interdigitated transducer deposited on the piezoelectric substrate, the interdigitated transducer having an input portion that receives input surface acoustic waves and an output portion that emits output surface acoustic waves; and a refrigerant sensor film located between the input portion and the output portion of the interdigitated transducer, the refrigerant sensor film including a sorbent material that is selected for preferential adsorption of a target refrigerant over atmospheric gases. Adsorption of the target refrigerant by the sorbent material results in a frequency shift of a frequency of the output surface acoustic waves relative to a frequency of the input surface acoustic waves. The SAW sensor may include one or more of the following features, either individually or in combination.

In an exemplary embodiment of the SAW sensor, the sorbent material is a metal organic framework (MOF) material.

In an exemplary embodiment of the SAW sensor, the MOF is generated from an organic building unit and a metal center including one of alkali, alkaline, transition, lanthanides and actinides with 2+, 3+ and 4+ oxidation number, and the organic building unit includes one of 1,4-benezedicarboxylate, 1,3-benzene-dicarboxylate, 1,2,4,5-benezetetracarboxylate, 1,3,5-benzene-tricarboxylate, 4,4'-sulfonyldibenzoate or an organic macrocycles.

In an exemplary embodiment of the SAW sensor, the sorbent material is a covalent organic framework (COF) material.

In an exemplary embodiment of the SAW sensor, the SAW sensor further includes an input refection grating that adds resonance to generate the input surface acoustic waves, and an output reflection grating that adds resonance to the output surface acoustic waves.

In an exemplary embodiment of the SAW sensor, the SAW sensor further includes a signal generator for generating an input signal to generate the input surface acoustic waves, and a signal processing unit that is configured to process the output surface acoustic waves, wherein the signal processing unit determines whether the target refrigerant is present at the SAW sensor based on the frequency shift of the output surface acoustic waves relative to the input surface acoustic waves.

In an exemplary embodiment of the SAW sensor, the SAW sensor includes a piezoelectric substrate that is delineated into a reference channel and a refrigerant channel; the reference channel comprising a first interdigitated transducer deposited on the piezoelectric substrate, the first interdigitated transducer having an input portion that receives input surface acoustic waves and an output portion that emits output surface acoustic waves; the refrigerant channel comprising a second interdigitated transducer deposited on the piezoelectric substrate, the second interdigitated transducer having an input portion that receives input surface acoustic waves and an output portion that emits output surface acoustic waves; and a refrigerant sensor film located between the input portion and the output portion of the second interdigitated transducer, the refrigerant sensor film including a sorbent material that is selected for preferential adsorption of a target refrigerant over atmospheric gases; and wherein in the refrigerant channel adsorption of the target refrigerant by the sorbent material results in a frequency shift of a frequency of the output surface acoustic waves relative to a frequency of the input surface acoustic waves, and in the reference channel there is no frequency shift of a frequency of the output surface acoustic waves relative to a frequency of the input surface acoustic waves.

In an exemplary embodiment of the SAW sensor, the SAW sensor further includes a signal generator for generating an input signal to generate the input surface acoustic waves, and a signal processing unit that is configured to process the output surface acoustic waves, wherein the signal processing unit determines whether the target refrigerant is present at the SAW sensor based on a comparison of the frequency shift of the output surface acoustic waves relative to the input surface acoustic waves in the refrigerant channel and a frequency of the output surface acoustic waves from the reference channel.

In an exemplary embodiment of the SAW sensor, the SAW sensor includes a piezoelectric substrate; an interdigitated transducer deposited on the piezoelectric substrate, the interdigitated transducer having an input portion that receives input surface acoustic waves and an output portion that emits output surface acoustic waves; and a refrigerant sensor film located between the input portion and the output portion of the interdigitated transducer, the refrigerant sensor film including a sorbent material that is selected for preferential adsorption of a target substance; wherein the sorbent material is a metal organic framework (MOF) material; and wherein adsorption of the target substance by the sorbent material results in a frequency shift of a frequency of the output surface acoustic waves relative to a frequency of the input surface acoustic waves.

In an exemplary embodiment of the SAW sensor, the SAW sensor includes a piezoelectric substrate that is delineated into a reference channel and a refrigerant channel; the reference channel comprising a first interdigitated transducer deposited on the piezoelectric substrate, the first interdigitated transducer having an input portion that receives input surface acoustic waves and an output portion that emits output surface acoustic waves; the refrigerant channel comprising a second interdigitated transducer deposited on the piezoelectric substrate, the second interdigitated transducer having an input portion that receives input surface acoustic waves and an output portion that emits output surface acoustic waves; and a refrigerant sensor film located between the input portion and the output portion of the second interdigitated transducer, the refrigerant sensor film including a sorbent material that is selected for preferential adsorption of a target substance; wherein the sorbent material is a metal organic framework (MOF) material; and wherein in the refrigerant channel adsorption of the target substance by the sorbent material results in a frequency shift of a frequency of the output surface acoustic waves relative to a frequency of the input surface acoustic waves, and in the reference channel there is no frequency shift of a frequency of the output surface acoustic waves relative to a frequency of the input surface acoustic waves.

Another aspect of the invention is method of detecting a target refrigerant that includes the steps of: inputting an input signal to a surface acoustic wave (SAW) sensor to generate input surface acoustic waves; propagating the input surface acoustic waves through a refrigerant sensor film of the SAW sensor to generate output surface acoustic waves, wherein the refrigerant sensor film includes a sorbent material that is selected for preferential adsorption of the target refrigerant over atmospheric gases; measuring the output surface acoustic waves and a calculating a frequency shift of a frequency of the output surface acoustic waves relative to a frequency of the input surface acoustic waves; and determining a concentration of the target refrigerant based on the frequency shift. The method may include one or more of the following features, either individually or in combination.

In an exemplary embodiment of the method of detecting a target refrigerant, the sorbent material is a metal organic framework (MOF) material.

In an exemplary embodiment of the method of detecting a target refrigerant, the MOF is generated from an organic building unit and a metal center including one of alkali, alkaline, transition, lanthanides and actinides with 2+, 3+ and 4+ oxidation number, and the organic building unit includes one of 1,4-beneze-dicarboxylate, 1,3-benzene-dicarboxylate, 1,2,4,5-beneze-tetracarboxylate, 1,3,5-benzene-tricarboxylate, 4,4'-sulfonyldibenzoate or an organic macrocycles.

In an exemplary embodiment of the method of detecting a target refrigerant, the sorbent material is a covalent organic framework (COF) material.

In an exemplary embodiment of the method of detecting a target refrigerant, the SAW sensor comprises a refrigerant channel that includes the refrigerant sensor film and a reference channel that does not include a refrigerant sensor film, the method further comprising: propagating the input surface acoustic waves through the reference channel to generate output surface acoustic waves from the reference channel; measuring the output surface acoustic waves from the reference channel; and determining the concentration of the target refrigerant based on a comparison of the frequency shift of the output surface acoustic waves relative to the input surface acoustic waves in the refrigerant channel and a frequency of the output surface acoustic waves from the reference channel.

In an exemplary embodiment of the method of detecting a target refrigerant, the target refrigerant is a class A2L or class A3 refrigerant.

In an exemplary embodiment of the method of detecting a target refrigerant, wherein the target refrigerant is an R32 refrigerant.

In an exemplary embodiment of the method of detecting a target refrigerant, the method further includes optimizing at least one of a pore size and thickness of the refrigerant sensor film for detecting one or more specific target refrigerants.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A surface acoustic wave (SAW) sensor for sensing a refrigerant comprising:
   a piezoelectric substrate that is delineated into a reference channel and a refrigerant channel;
   the reference channel comprising a first interdigitated transducer deposited on the piezoelectric substrate, the first interdigitated transducer having an input portion that receives input surface acoustic waves and an output portion that emits output surface acoustic waves;
   the refrigerant channel comprising a second interdigitated transducer deposited on the piezoelectric substrate, the second interdigitated transducer having an input portion that receives input surface acoustic waves and an output portion that emits output surface acoustic waves; and a refrigerant sensor film located between the input portion and the output portion of the second interdigitated transducer, the refrigerant sensor film including a sorbent material that is selected for preferential adsorption of a target refrigerant over atmospheric gases;
   wherein in the refrigerant channel adsorption of the target refrigerant by the sorbent material results in a frequency shift of a frequency of the output surface acoustic waves relative to a frequency of the input surface acoustic waves, and in the reference channel there is no frequency shift of a frequency of the output surface acoustic waves relative to a frequency of the input surface acoustic waves;
   wherein the sorbent material is a metal organic framework (MOF) material that is generated from an organic building unit and a metal center including one of alkali, alkaline, transition, lanthanides and actinides with 2+, 3+ and 4+ oxidation number, and the organic building unit includes one of 1,4-beneze-dicarboxylate, 1,3-benzene-dicarboxylate, 1,2,4,5-beneze-tetracarboxylate, 1,3,5-benzene-tricarboxylate, 4,4'-sulfonyldibenzoate or an organic macrocycles; or
   wherein the sorbent material is a covalent organic framework (COF) material.

2. The SAW sensor of claim 1, wherein each of the reference channel and the refrigerant channel further comprises an input refection grating that adds resonance to generate the input surface acoustic waves, and an output reflection grating that adds resonance to the output surface acoustic waves.

3. The SAW sensor of claim 1, further comprising a signal generator for generating an input signal to generate the input surface acoustic waves, and a signal processing unit that is configured to process the output surface acoustic waves, wherein the signal processing unit determines whether the target refrigerant is present at the SAW sensor based on a comparison of the frequency shift of the output surface acoustic waves relative to the input surface acoustic waves in the refrigerant channel and a frequency of the output surface acoustic waves from the reference channel.

4. A method of detecting a target refrigerant comprising the steps of:
   inputting an input signal to a surface acoustic wave (SAW) sensor to generate input surface acoustic waves;
   propagating the input surface acoustic waves through a refrigerant sensor film of the SAW sensor to generate output surface acoustic waves, wherein the refrigerant sensor film includes a sorbent material that is selected for preferential adsorption of the target refrigerant over atmospheric gases;
   measuring the output surface acoustic waves and a calculating a frequency shift of a frequency of the output surface acoustic waves relative to a frequency of the input surface acoustic waves; and
   determining a concentration of the target refrigerant based on the frequency shift;
   wherein the sorbent material is a metal organic framework (MOF) material that is generated from an organic building unit and a metal center including one of alkali, alkaline, transition, lanthanides and actinides with 2+, 3+ and 4+ oxidation number, and the organic building unit includes one of 1,4-beneze-dicarboxylate, 1,3- benzene-dicarboxylate, 1,2,4,5-beneze-tetracarboxylate, 1,3,5-benzene-tricarboxylate, 4,4'-sulfonyldibenzoate or an organic macrocycles; or the sorbent material is a covalent organic framework (COF) material; and wherein the SAW sensor comprises a refrigerant channel that includes the refrigerant sensor film and a reference channel that does not include a refrigerant sensor film, the method further comprising:

propagating the input surface acoustic waves through the reference channel to generate output surface acoustic waves from the reference channel;

measuring the output surface acoustic waves from the reference channel; and determining the concentration of the target refrigerant based on a comparison of the frequency shift of the output surface acoustic waves relative to the input surface acoustic waves in the refrigerant channel and a frequency of the output surface acoustic waves from the reference channel.

5. The method of detecting a target refrigerant of claim 4, wherein the target refrigerant is a class A2L or class A3 refrigerant.

6. The method of detecting a target refrigerant of claim 4, wherein the target refrigerant is an R32 refrigerant.

7. The method of detecting a target refrigerant of claim 4, further comprising optimizing at least one of a pore size and thickness of the refrigerant sensor film for detecting one or more specific target refrigerants.

8. A method of detecting a target refrigerant comprising the steps of:

inputting an input signal to a surface acoustic wave (SAW) sensor to generate input surface acoustic waves;

propagating the input surface acoustic waves through a refrigerant sensor film of the SAW sensor to generate output surface acoustic waves, wherein the refrigerant sensor film includes a sorbent material that is selected for preferential adsorption of the target refrigerant over atmospheric gases;

measuring the output surface acoustic waves and a calculating a frequency shift of a frequency of the output surface acoustic waves relative to a frequency of the input surface acoustic waves;

determining a concentration of the target refrigerant based on the frequency shift;

wherein the sorbent material is a metal organic framework (MOF) material that is generated from an organic building unit and a metal center including one of alkali, alkaline, transition, lanthanides and actinides with 2+, 3+ and 4+ oxidation number, and the organic building unit includes one of 1,4-beneze-dicarboxylate, 1,3-benzene-dicarboxylate, 1,2,4,5-beneze-tetracarboxylate, 1,3,5-benzene-tricarboxylate, 4,4'-sulfonyldibenzoate or an organic macrocycles; or the sorbent material is a covalent organic framework (COF) material; and optimizing at least one of a pore size and thickness of the refrigerant sensor film for detecting one or more specific target refrigerants.

* * * * *